(No Model.)
S. F. KERSLAKE.
FRICTION CLUTCH.
No. 436,140. Patented Sept. 9, 1890.
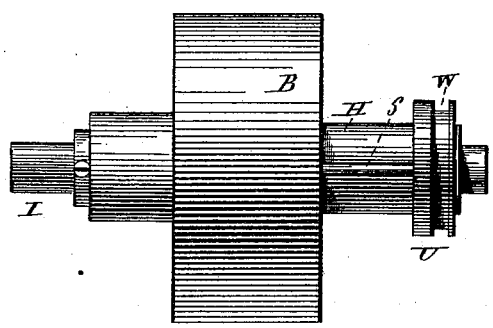
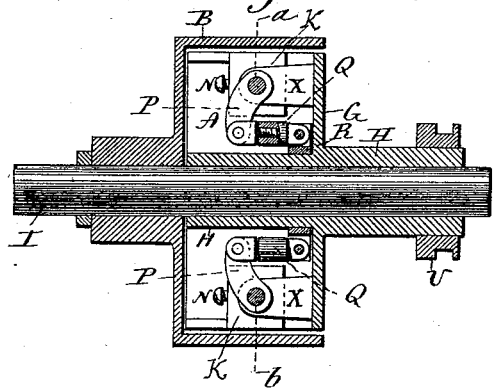
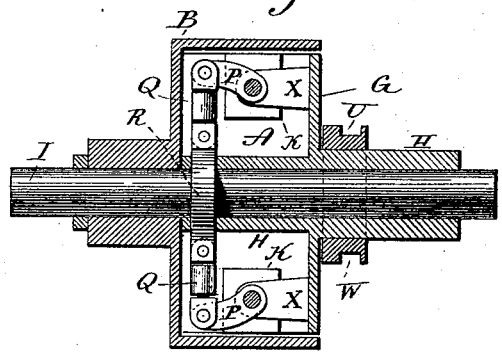
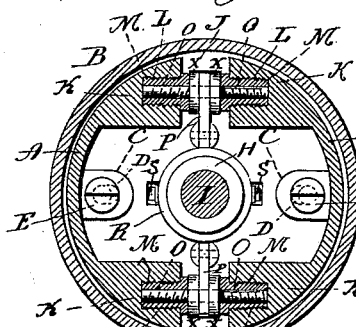
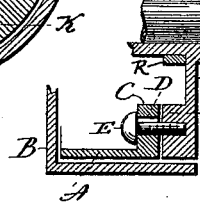
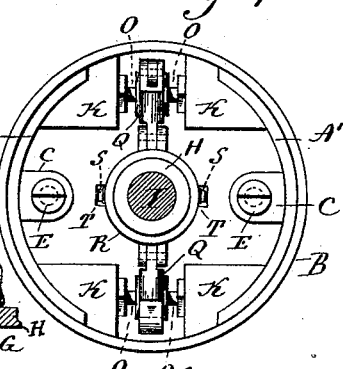

UNITED STATES PATENT OFFICE.

SEABOURNE F. KERSLAKE, OF TURNER'S FALLS, MASSACHUSETTS.

FRICTION-CLUTCH.

SPECIFICATION forming part of Letters Patent No. 436,140, dated September 9, 1890.

Application filed March 31, 1890. Serial No. 345,933. (No model.)

*To all whom it may concern:*

Be it known that I, SEABOURNE F. KERSLAKE, of Turner's Falls, in the county of Franklin and State of Massachusetts, have invented a new Improvement in Friction-Clutches; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of my improved clutch; Fig. 2, a view thereof in vertical section with the clutch-segments thrown apart to engage them with the shell; Fig. 3, a similar view with the clutch-segments thrown inward to release the shell; Fig. 4, a view of the clutch in end elevation; Fig. 5, a view thereof in section on the line *a b* of Fig. 2; Fig. 6, a detached enlarged sectional view showing the connection between one of the segments and the carrier.

My invention relates to an improvement in friction-clutches, the object being to produce a clutch of quick, reliable, and positive action and of strong, durable, and well-protected construction.

With these ends in view my invention consists in a clutch having certain details of construction and combinations of parts, as will be hereinafter described, and pointed out in the claims.

As herein shown, the segments A and A' are nearly complete semicircles, their peripheries conforming to the interior wall of the shell B, with which they are engaged when thrown apart, so that they are rotated with it. These segments are provided upon their inner faces and midway of their length with lugs C, having radially-elongated slots D, receiving set-screws E, entering shoulders F, formed at opposite points upon the carrier G, which has here the form of a disk and is rigidly connected with the hub H. The described connection between the said carrier and segments permits them to be moved radially with respect to the said hub and to the shaft I, upon which it is mounted. The corners of the segments are cut away, as at J J, for clearance, and the ends of the segments are provided with bearings K K, chambered, as at L, to receive internally-threaded sockets M, held in place by set-screws N, entering the said bearings. The said sockets receive the opposite ends of right and left hand screws O O, respectively, having their opposite ends entered into the sockets in the adjacent ends of the segments. Each of these screws O has rigidly connected with it a lever P, having a link Q pivoted to its outer end, the inner ends of the said links being pivotally secured to a collar R, mounted upon the hub H and connected at opposite points upon its periphery by two rods S S, located close to and extending in line with the hub and passing through perforations T in the disk-shaped carrier and threaded at their outer ends into a collar U, mounted upon the exposed end of the hub and movable thereon by means of the usual shifting-lever, which is not shown, but which is provided with the usual fork entering the groove W in the collar. Two supporting-arms X X, secured to the carrier, are provided at their outer ends with openings through which the adjusting-screws O pass on opposite sides of the operating-levers P, these arms being provided to hold the ends of the segments in position and to relieve the screws from strain.

The action of my improved friction-clutch is very simple and reliable, and the leverage of its moving parts is such that the segments are impinged with such force against the inner face of the shell that the two are very positively coupled together. My improved construction also has comparatively few parts, and thus is adapted to be made very strong and durable. The clutch is also very compact, and, with the disk-shaped carrier closing one end of the shell, its parts are protected from accidental engagement and breakage, and also from the introduction into it of dirt and other foreign substances.

If desired, I may in constructing my improved clutch employ shorter segments than are herein shown, and more than two segments arranged on the same principle may be used, if found expedient. I would have it understood, therefore, that I do not limit myself to the exact construction described, but hold myself at liberty to make such changes and alterations as fairly fall within the spirit and scope of my invention.

I am aware that a friction-clutch having segments connected and operated by right and left hand screws is not new, and I do not broadly claim the same.

Having now described my invention, what I claim, and desire to secure by Letters Patent, is—

1. In a friction-clutch, the combination, with the hub and shell thereof, of a disk-shaped carrier closing one end of the latter, segments located within the shell and supported from the inner face of the said carrier, right and left hand screws entered into the adjacent ends of the segments, a collar mounted on the hub and located within the shell, lever-connections between the screws and collar also located within the shell, and means connected with the collar and extending outside of the carrier in line with the hub for moving the collar, and hence turning the screws to shift the segments, the said carrier closing the shell within which the main part of the mechanism is located, substantially as described.

2. In a friction-clutch, the combination, with the hub and shell thereof, of a disk-shaped carrier closing one end of the latter, two segments supported from the inner face of the carrier so as to be moved radially with respect to the hub, two right and left hand screws the ends whereof respectively enter the adjacent ends of the segments, two supporting-arms attached to the inner face of the disk-shaped carrier and having their ends provided with openings through which the said screws pass, operating-levers located entirely within the shell and rigidly connected with the said screws, links attached to the said levers and also located within the shell, a movable collar mounted on the hub and located within the shell, and an operating-collar located on the hub, but outside of the shell and carrier, and connected with the movable collar by parallel rods located close to and extending in line with the hub, substantially as described.

SEABOURNE F. KERSLAKE.

Witnesses:
K. E. SANDERS,
JOHN JAMISON.